United States Patent
El Haddad et al.

(10) Patent No.: US 10,304,588 B2
(45) Date of Patent: May 28, 2019

(54) CABLE HARNESS CONFIGURABLE FROM A NEUTRAL STATE TO ONE OF AT LEAST TWO CONFIGURATION SETTINGS

(71) Applicant: BOMBARDIER INC., Dorval (CA)

(72) Inventors: Anthony El Haddad, St-Laurent (CA); Philippe Desy, Prévost (CA); Jean-Guy Gaudreau, St-Bernardin (CA)

(73) Assignee: C SERIES AIRCRAFT LIMITED PARTNERSHIP, Mirabel (CA)

( * ) Notice: Subject to any disclaimer, the term of this patent is extended or adjusted under 35 U.S.C. 154(b) by 0 days.

(21) Appl. No.: 15/736,571

(22) PCT Filed: Jun. 17, 2016

(86) PCT No.: PCT/IB2016/053629
§ 371 (c)(1),
(2) Date: Dec. 14, 2017

(87) PCT Pub. No.: WO2016/203451
PCT Pub. Date: Dec. 22, 2016

(65) Prior Publication Data
US 2018/0286531 A1    Oct. 4, 2018

Related U.S. Application Data

(60) Provisional application No. 62/182,160, filed on Jun. 19, 2015.

(51) Int. Cl.
*B64D 47/00* (2006.01)
*F16D 66/00* (2006.01)
(Continued)

(52) U.S. Cl.
CPC ......... *H01B 7/009* (2013.01); *B60R 16/0207* (2013.01); *B64D 47/00* (2013.01);
(Continued)

(58) Field of Classification Search
CPC ...... H01B 7/009; H01B 7/0045; B64D 47/00; B64D 2221/00; H01R 24/28
(Continued)

(56) References Cited

U.S. PATENT DOCUMENTS

| 4,384,755 | A | | 5/1983 | Perretta |
| 4,726,790 | A | * | 2/1988 | Hadjis ................ H01R 13/7195 333/185 |

(Continued)

FOREIGN PATENT DOCUMENTS

| EP | 1094567 A1 | 4/2001 |
| EP | 1315348 A2 | 5/2003 |

(Continued)

OTHER PUBLICATIONS

PCT international Search Report and Written Opinion dated Sep. 26, 2016 re: International Application No. PCT/IB2016/053629.
(Continued)

*Primary Examiner* — Andargie M Aychillhum
*Assistant Examiner* — Michael F McAllister
(74) *Attorney, Agent, or Firm* — Norton Rose Fulbright Canada LLP

(57) ABSTRACT

There is described herein a harness (106) that remains neutral until configured by a configuration device (110). Wires that connect to specific pins responsible for the configuration of a system are taken out and connected to a configuration port (108) on the harness (106). The configuration port (108), when mated with the configuration device (110), sets a configuration setting of the system. The configuration device (110) may be used to set the power and/or signal parameters of the harness (106) for a system or to configure various options within the system itself or another system.

16 Claims, 7 Drawing Sheets

(51) Int. Cl.
  H01R 24/28 (2011.01)
  H01B 7/00 (2006.01)
  B60R 16/02 (2006.01)
(52) U.S. Cl.
  CPC ........... F16D 66/00 (2013.01); H01B 7/0045 (2013.01); H01R 24/28 (2013.01); *B64D 2221/00* (2013.01)
(58) Field of Classification Search
  USPC ........................................................ 174/72 A
  See application file for complete search history.

(56) References Cited

U.S. PATENT DOCUMENTS

| | | | | |
|---|---|---|---|---|
| 5,026,293 | A * | 6/1991 | Wilson | H01R 13/6658 439/620.22 |
| 5,072,185 | A * | 12/1991 | Rockwell | G01R 31/021 29/593 |
| 5,119,546 | A | 6/1992 | Cameron et al. | |
| 5,869,907 | A | 2/1999 | Marler | |
| 6,259,027 | B1 | 7/2001 | Watanabe | |
| 6,439,923 | B1 | 8/2002 | Kirkendall et al. | |
| 6,960,102 | B2 | 11/2005 | Styles | |
| 7,112,969 | B1 * | 9/2006 | Thomas | G01R 31/021 324/539 |
| 7,225,065 | B1 * | 5/2007 | Hunt | B60R 16/0207 701/33.2 |
| 7,447,574 | B1 * | 11/2008 | Washicko | B60R 16/0207 701/33.4 |
| 7,763,995 | B2 | 7/2010 | Joshi et al. | |
| 2003/0056970 | A1 | 3/2003 | Young | |
| 2006/0163948 | A1 | 7/2006 | Kim et al. | |
| 2015/0055305 | A1 | 2/2015 | Mackey et al. | |

FOREIGN PATENT DOCUMENTS

| | | |
|---|---|---|
| EP | 1596640 A1 | 11/2005 |
| EP | 2642608 A2 | 9/2013 |
| EP | 2876010 A1 | 5/2015 |
| FR | 2144133 A5 | 2/1973 |
| FR | 2913149 A1 | 8/2008 |

OTHER PUBLICATIONS

English translation of European patent document No. 1596640 dated Nov. 16, 2005, https://www.google.ca/patents/EP1596640A1?dq=EP1596640&cl=en, accessed on Nov. 28, 2017.
English translation of France patent document No. 2913149 dated Aug. 29, 2008, https://www33.orbit.com/?locale=en&ticket=1b0917c2-f75b-4681-8c73-5ec2410fce1e&embedded=false#PatentDocumentPage, accessed on Nov. 28, 2017.
English Translation of Selected Passages from FR 2144133A5 dated Feb. 9, 1973, obtained from https://translate.google.ca/ on Dec. 14, 2017.

* cited by examiner

CABLE HARNESS CONFIGURABLE FROM A NEUTRAL STATE TO ONE OF AT LEAST TWO CONFIGURATION SETTINGS

CROSS-REFERENCE TO RELATED APPLICATIONS

The present application is a national phase application under 35 U.S.C. 371 of International Patent Application No. PCT/IB2016/053629 filed on Jun. 17, 2016, which claims priority from U.S. Provisional Patent Application No. 62/182,160 filed on Jun. 19, 2015, the contents of which are hereby incorporated by reference.

TECHNICAL FIELD

The present disclosure relates to the field of configurable harnesses in aircrafts, vehicles, and other types of equipment.

BACKGROUND OF THE ART

Certain aircraft models are made with common structural parts, such as the cockpit, the forward fuse, the rear barrel, and the tail cone. Common structural parts are intended to be installed seamlessly with any aircraft model. Within these structural parts, systems are installed which are interconnected through wiring harnesses for power and/or signals. These systems, through pin programming, are configured for a specific aircraft model on which they are installed. The structural parts are shipped with harnesses already installed and therefore, any advantage gained from having common structural parts between aircraft models is lost due to the differences in the harness configuration, which are adapted for the systems to which they will be connected.

One existing solution to this problem is for a technician to dismantle the harness connector prior to connecting it to a system, and short specific pins to align the system with the aircraft model. This is time consuming and requires specific skilled labour. Another solution is to provide strapping boxes where the wiring to program the various systems all converges and is shorted through switches in the strapping box. This solution is heavy, complex, and brings about safety issues.

Therefore, there is a need to address some of these issues.

SUMMARY

There is described herein a harness that remains neutral until configured by a configuration device. Wires that connect to specific pins responsible for the configuration of a system are taken out and connected to a configuration port on the harness. The configuration port, when mated with the configuration device, sets a configuration setting of the system. The configuration device may be used to set the power and/or signal parameters of the harness for a system or to configure various options within the system itself or another system.

In accordance with a first broad aspect, there is provided an aircraft assembly comprising a structural component adapted to receive a system having at least a first configuration setting and a second configuration setting; and a harness installed within the structural component. The harness comprises a set of conducting wires having at least a first end and a second end; a connector at the first end of the conducting wires for connecting to the system to provide signals or electrical power thereto; and a configuration port intermediate to the first end and the second end and adapted for receiving a configuration device for configuring the harness to one of the first configuration setting and the second configuration setting, wherein the harness is neutral to the first configuration setting and the second configuration setting until the configuration device is mated with the configuration port.

In some embodiments, the first configuration setting and the second configuration setting comprise a first power level and a second power level, respectively, and the harness is configurable to one of the first power level and the second power level by the configuration device. Alternatively or in combination therewith, the first configuration setting and the second configuration setting comprise a first aircraft option and a second aircraft option, respectively, and the harness is configurable to one of the first aircraft option and the second aircraft option by the configuration device. Also alternatively or in combination therewith, the first configuration setting and second configuration setting comprises a plurality of configuration settings, the plurality of configuration settings corresponding to configurable options on the aircraft specified for one of at least two aircraft models.

In some embodiments, the configuration port is one of a male and a female connector, and the configuration device is the other of the male and female connector.

In some embodiments, the structural component is suitable for at least two aircraft models, the first configuration setting corresponding to a first aircraft model and the second configuration setting corresponding to a second aircraft model.

In some embodiments, the configuration port comprises at least three output pins, and the configuration device shorts two of the at least three output pins together to configure the harness.

The system may be a line replaceable unit (LRU). The LRU may be one of an avionics system, a brake system, a fly by wire system, a fuel system, and a landing gear system.

In accordance with another broad aspect, there is provided a kit for configuring an aircraft system to one of at least two configuration settings. The kit comprises components (a) and (b). Component (a) comprises a harness comprising a set of conducting wires having at least a first end and a second end; a connector at the first end of the conducting wires for connecting to the aircraft system and adapted for providing signals or electrical power thereto; and a configuration port intermediate to the first end and the second end. Component (b) comprises at least one configuration device matable with the configuration port and adapted for configuring the harness to one of the first configuration setting and the second configuration setting, wherein the harness is neutral to the first configuration setting and the second configuration setting until the configuration device is mated with the configuration port.

In some embodiments, the at least one configuration device comprises a first configuration device adapted for configuring the harness to the first configuration setting and a second configuration device adapted for configuring the harness to the second configuration setting.

In some embodiments, the first configuration setting and the second configuration setting comprise a first power level and a second power level, respectively, and the harness is configurable to one of the first power level and the second power level by the configuration device. Alternatively, or in combination therewith, the first configuration setting and the second configuration setting comprise a first aircraft option and a second aircraft option, respectively, and the harness is configurable to one of the first aircraft option and the second aircraft option by the configuration device. Also alternatively or in combination therewith, the at least a first configuration setting and a second configuration setting comprises a plurality of configuration settings, the plurality of configuration settings corresponding to configurable options on the aircraft specified for one of at least two aircraft models.

In some embodiments, the configuration port is one of a male and a female connector, and the configuration device is the other of the male and female connector.

In some embodiments, the configuration port comprises at least three output pins, and wherein the configuration device shorts two of the at least three output pins together to configure the harness.

In accordance with yet another broad aspect, there is provided a method for configuring an aircraft system to one of at least two configuration settings. The method comprises receiving an aircraft assembly comprising a structural part and a harness installed therein, the aircraft assembly as received being neutral to the at least two configuration settings, the harness having a configuration port for receiving a configuration device; assembling the aircraft assembly with the aircraft system at a final assembly line; and mating the configuration device with the configuration port of the harness at the final assembly line, thereby configuring the system to a given one of the at least two configuration settings.

In some embodiments, assembling the aircraft assembly with the aircraft system comprises assembling the aircraft assembly with a line replaceable unit (LRU) selected from a group comprising an avionics system, a brake system, a fly by wire system, a fuel system, and a landing gear system.

In some embodiments, mating the configuration device with the configuration port comprises inserting a connector into the configuration port to short two of at least three output pins together to configure the harness.

In some embodiments, receiving an aircraft assembly comprises receiving an aircraft assembly suitable for at least two aircraft models, and each one of the at least two configuration settings correspond to one of the at least two aircraft models.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

There is provided herein a configurable harness that remains neutral until configured by a configuration device. For the purposes of the present description, the configurable harness will be described with respect to an aircraft. However, it should be understood that the configurable harness may also be used in other vehicles having configurable parameters, namely power requirements or vehicle options. For example, the configurable harness may be used in trains, buses, subway cars, limousines, and other automobiles. The configurable harness may also be used in non-vehicle equipment or machinery, such as construction machinery, household items, audio consoles, and other electronic goods. Other possible applications will be readily understood by those skilled in the art.

Figure 1:
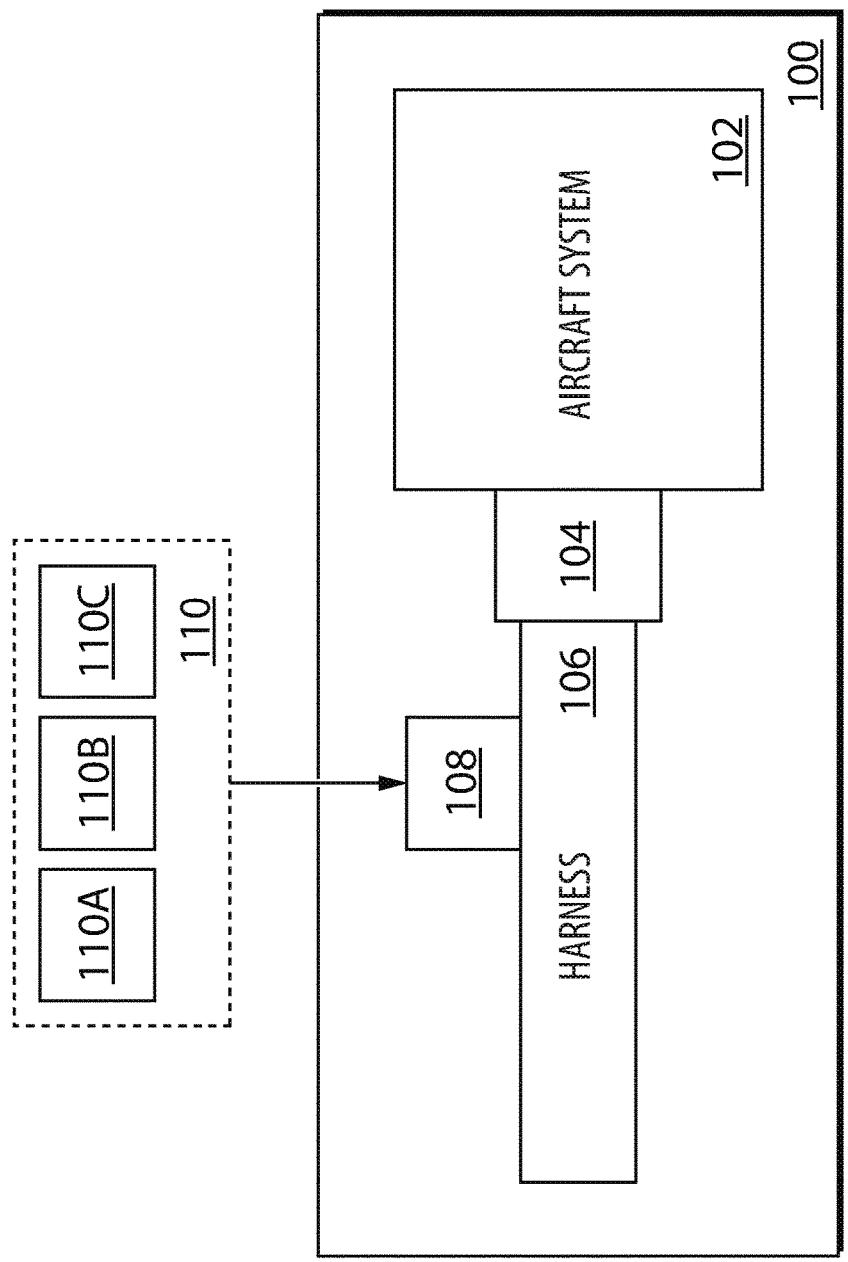
FIG. 1 illustrates an exemplary embodiment for an aircraft assembly connected to an aircraft system.

Referring to FIG. 1, there is illustrated an aircraft assembly. The assembly comprises a structural part 100 and a harness 106 installed therein. The harness 106 is connected to an aircraft system 102 via a connector 104. A configuration port 108 receives a selected one from a plurality of configuration devices 110a, 110b, 110c (collectively referred to herein as 110) for configuring the harness 106. The harness 106 may be used for configuring various parameters of the system 102 using the configuration device 110. A different configuration device 110 is mated with the configuration port 108 as a function of the desired configuration setting. Once the selected configuration device 110 is mated with the configuration port 108, the configuration setting of the system 102 is set. The structural part 100 and harness 106 thus remain neutral until one of the configuration devices 110 is mated with the configuration port 108.

The harness 106 may be used for configuring various parameters of the system 102. In some embodiments, the parameters are power and/or signal requirements which may differ between aircraft models. For example, a brake system for aircraft model A may consume more power to stop the heavier aircraft while a brake system for aircraft model B may consume less power to stop the lighter aircraft. The harness is thus neutral to the requirements until it is configured by the configuration device 110 via the configuration port 108. In some embodiments, the parameters are options available on some aircraft models and unavailable on other aircraft models. For example, autoland, which is a system that fully automates the landing procedure of an aircraft's flight, may be enabled on aircraft model A and disabled on aircraft model B via the configuration device 110. Alternatively, the autoland option may be enabled in some model A aircraft and disabled in other model A aircraft, again using the configuration device 110. In some embodiments, the parameters are a combination of options, power and/or signal settings. For example, a fuel quantity computer may be configured for imperial or metric units, and each configuration may be available for model A aircraft and model B aircraft. In this example, there may be four separate configuration devices 110 that can mate with the configuration port 108, one for each one of imperial/model A; imperial/model B; metric/model A; metric /model B. More or less possible configurations may be used, as desired.

The structural part 100 may comprise any large structural section of the aircraft, such as a cockpit, a forward/mid/aft fuselage section, a rear barrel, a tail cone, or an empennage. The system 102 may be a line-replaceable unit (LRU), such as an avionics system, a brake system, a fly by wire system, a fuel system, or a landing gear system. It may also be a sub-system or equipment from one of the larger structural sections of the aircraft, such as an emergency power supply unit, or a motor control system. The system 102 may correspond to any equipment or system within the aircraft that may be configured with more than one setting, such as but not limited to, engine gas temperature (EGT) thermocouple systems, igniter systems, full authority digital engine control (FADEC) systems, power management control systems, vibration monitoring systems, engine speed monitoring systems, and fire detection and extinguishing systems.

Figure 2:
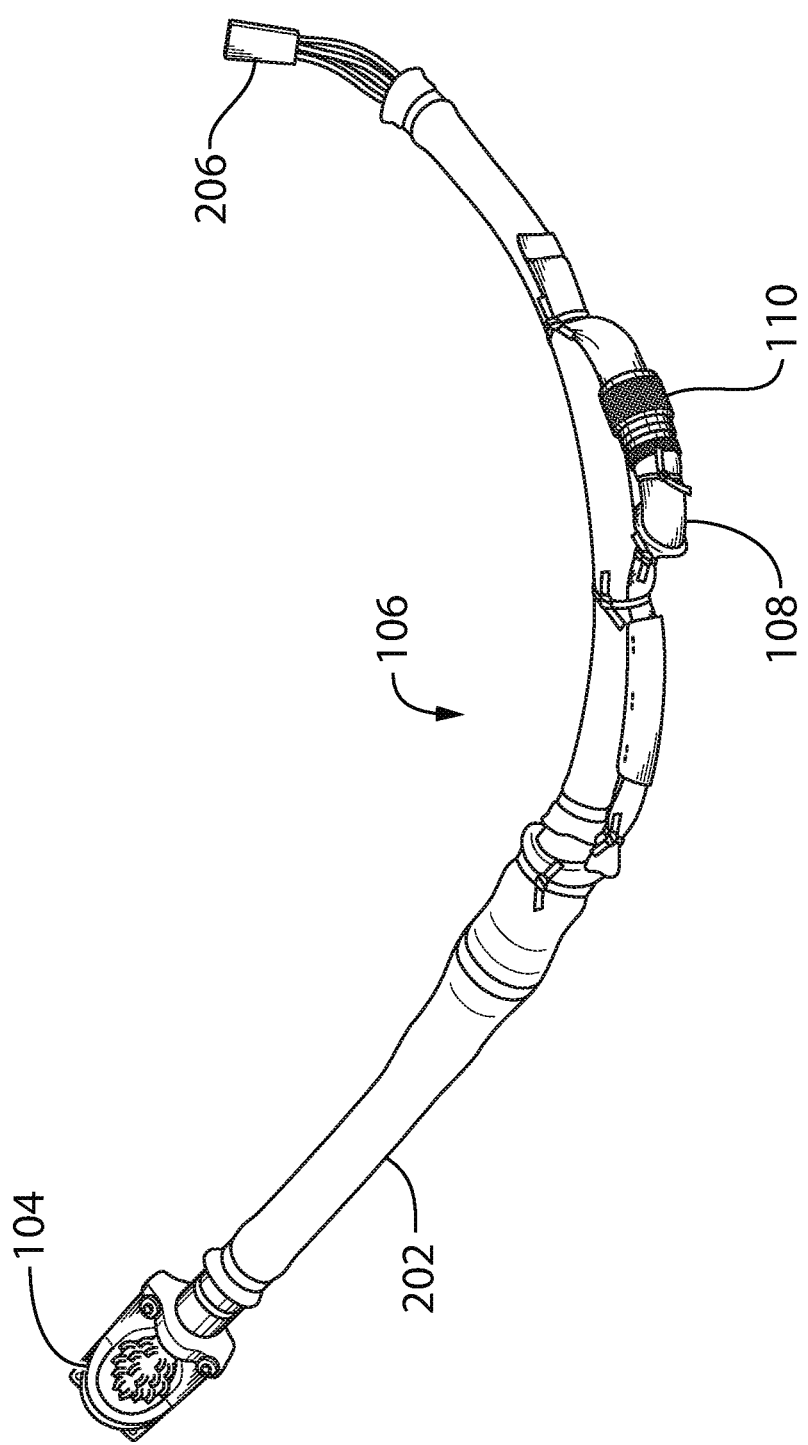
FIG. 2 is an exemplary embodiment of a configurable harness.

The harness 106, which may also be referred to as a cable harness, a cable assembly, a wiring assembly, or a wiring loom, comprises an assembly of cables or wires which transmit signals or electrical power to the system 102. The harness 106 may correspond to any type of electrical wiring harness, such as braided wiring harnesses, coaxial or RF cable assemblies, closed bundle harnesses, flight control wiring harnesses, and others. An exemplary embodiment is illustrated in FIG. 2. A set of wires (not shown) are bound together by a sleeve 202. Alternatively, the wires may also be bound together by straps, cable ties, cable lacing, electrical tape, conduit, a weave of extruded string, or a combination thereof. The connector 104 is provided at a first end of the harness 106, for connecting into the system 102. Signals and/or power are transmitted to the system 102 from the harness 106 via the connector 104. The second end of the harness may have a terminal 206 for connecting to another harness or system, as is illustrated in FIG. 2, or it may have a non-connecting termination.

Figure 3A:
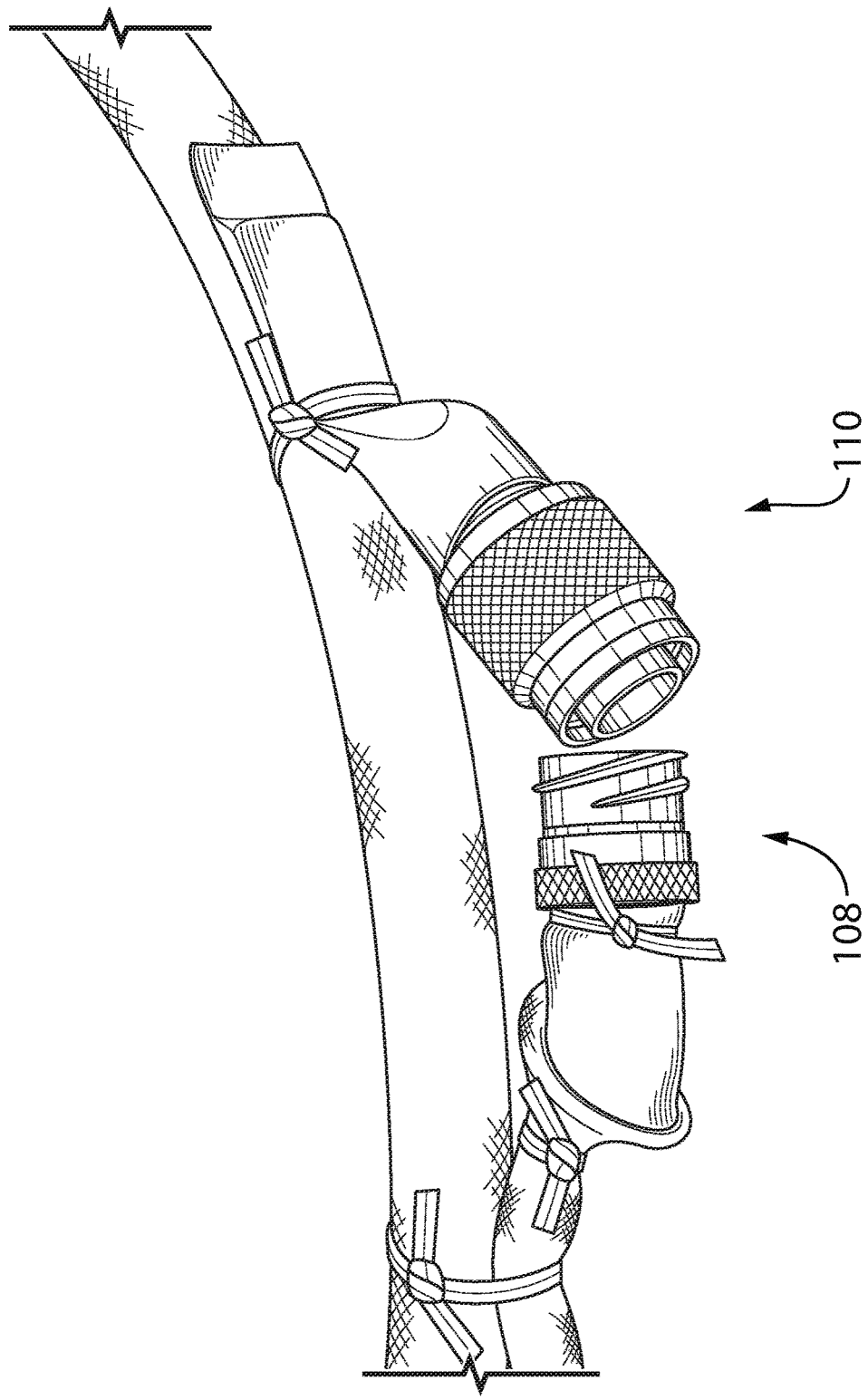
FIG. 3a is an exemplary embodiment of the configuration port and the configuration device in a disconnected state.
Figure 3B:
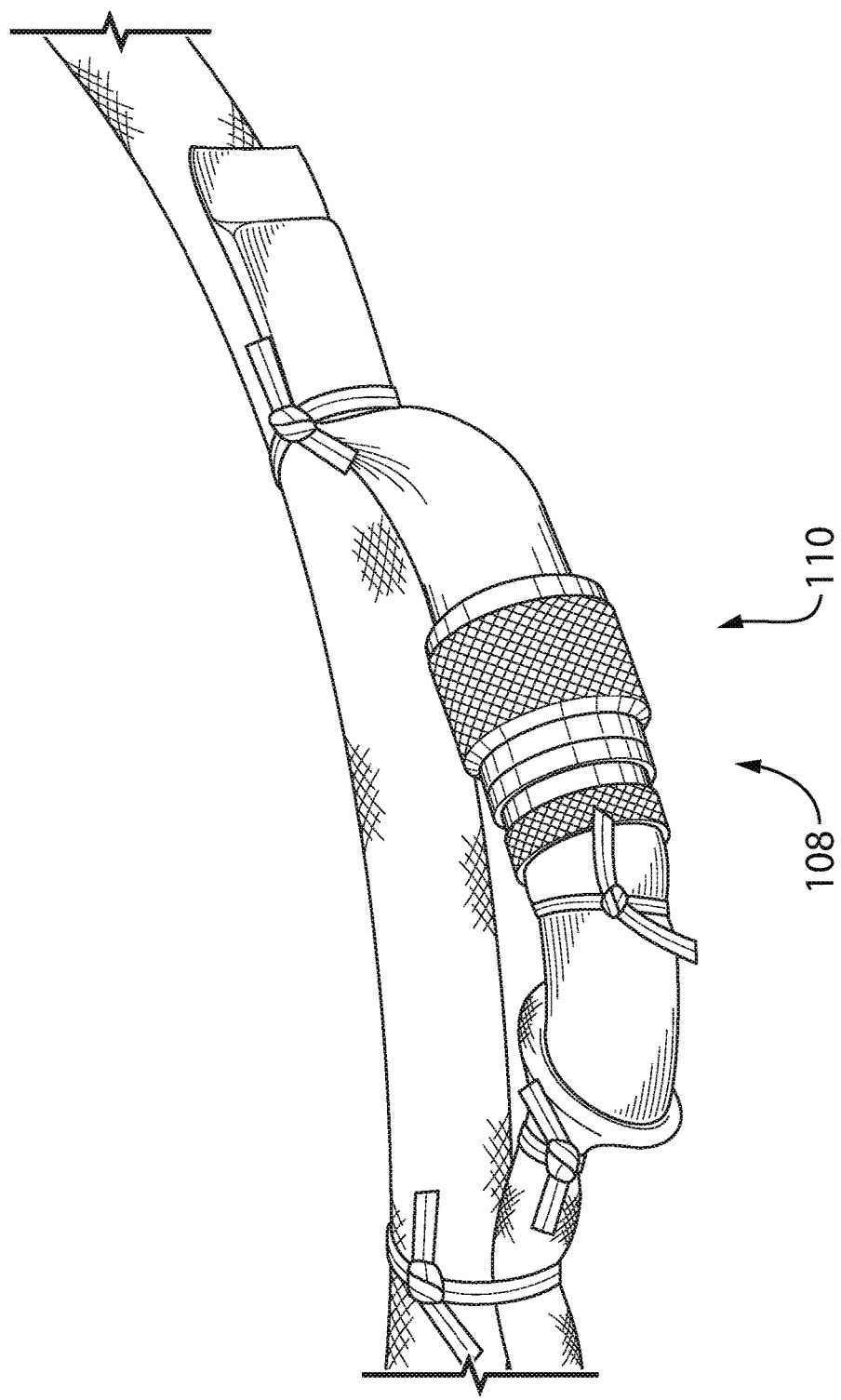
FIG. 3b is an exemplary embodiment of the configuration port and the configuration device in a connected state.

FIGS. 3a and 3b provide a close-up view of an exemplary embodiment of the configuration port 108 and the configuration device 110, in the connected and disconnected states, respectively. In the example illustrated, the configuration port 108 and configuration device 110 are a plug and socket connector, with the configuration port 108 acting as the socket and the configuration device 110 acting as the plug. In other embodiments, the two may be any electrical connector, such as a terminal block, a post, a crimp-on connector, an insulation-displacement connector, and a quick-disconnect connector. Other types of connectors may also be used. The wires in the harness 106 may be connected to contacts, also referred to as pins, in the configuration port 108. The physical construction and size of the configuration port 108 will determine the physical construction and size of the configuration device 110, as the two are mated to configure the wiring harness 106 and by extension, the system 102.

Figure 4:
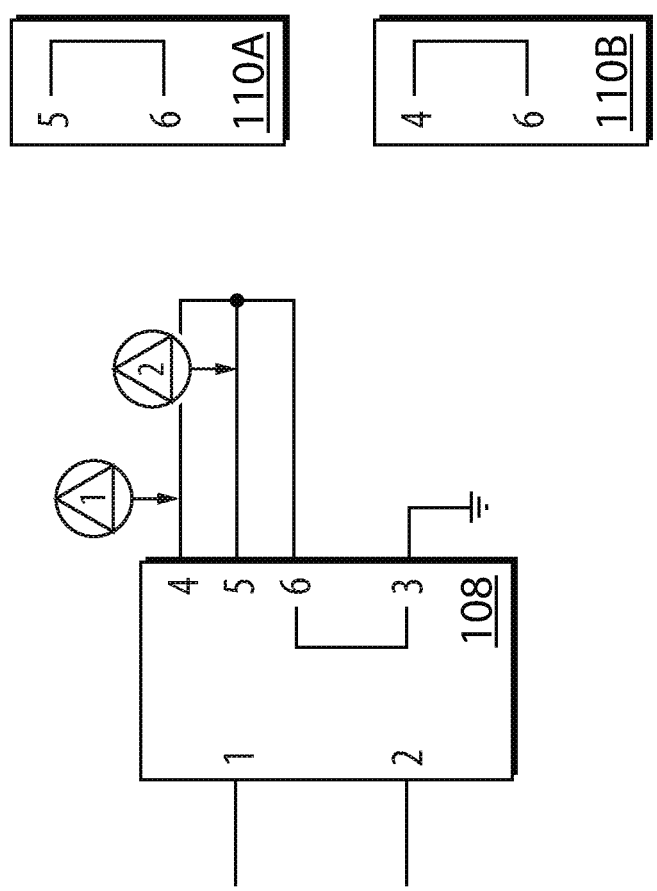
FIG. 4 is an exemplary embodiment of pin layout diagrams for the configuration port and the configuration device for two configuration settings.

The selected configuration device 110 is used to set the configuration setting of the harness 106 and thus the system 102. FIG. 4 is an exemplary embodiment for the pin-out of a configuration port 108 having two possible settings, and the two configuration devices 110a, 110b that mate with the configuration port 108 to set the assembly to a desired configuration setting. Pins 1 and 2 of the configuration port 108 correspond to the two configuration settings, respectively. Pin 4 is associated with pin 1 and pin 5 is associated with pin 2. Pin 6 is connected to pin 3, which is connected to ground. If configuration device 110a is mated with the configuration port, then pins 5 and 6 of the configuration port 108 are shorted together and a first configuration setting is selected through the grounding of pin 2. If configuration device 110b is mated with the configuration port 108, then pins 4 and 6 of the configuration port 108 are shorted together and a second configuration setting is selected through the grounding of pin 1.

Figure 5:
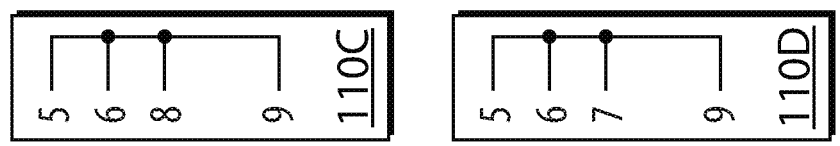
FIG. 5 is an exemplary embodiment of pin layout diagrams for the configuration port and the configuration device for four configuration settings.
Figure 5:
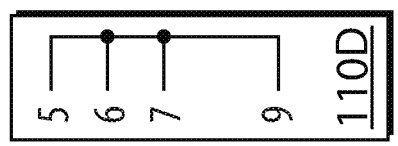
Figure 5:
Figure 5:
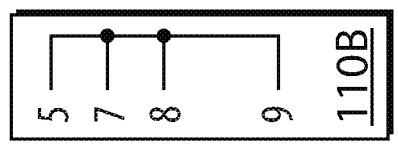
Figure 5:
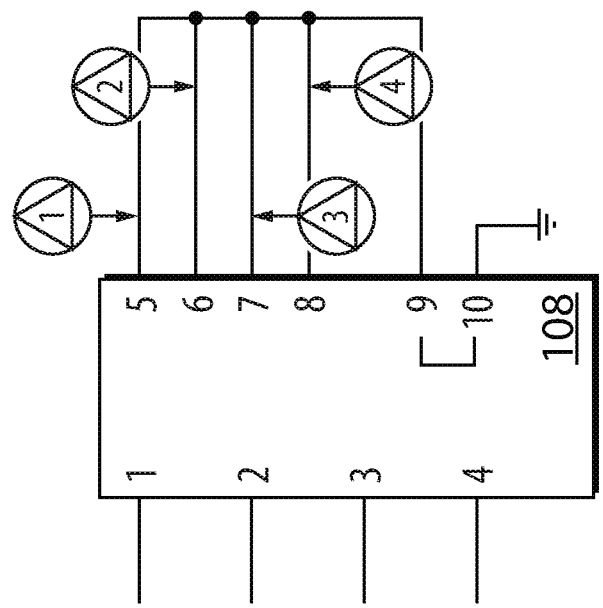

FIG. 5 is an exemplary embodiment for the pin-out of a configuration port 108 having four possible settings, and the four configuration devices 110a, 110b, 110c, 110d that mate with the configuration port 108 to set the assembly to a desired configuration setting. Similarly to the example of FIG. 4, each output pin 5 to 8 of the configuration port 108 is associated with one of pins 1 to 4, which each correspond to a given configuration setting. Each configuration device 110a, 110b, 110c, 110d will short three of the four output pints 5 to 8 together, thus disabling three of the possible configuration settings and enabling the remaining configuration setting. Other embodiments for the configuration port 108 and the configuration device 110 may also be used.

In some embodiments, the harness 106 and the configuration devices 110 are each associated with their own part numbers. A technical spec for a given assembly may refer to one of the plurality of configuration devices 110 that is to be used. In some embodiments, a kit for configuring an aircraft system to one of at least two configuration settings is provided with the configurable harness 106 and at least one configuration device 110 for connecting to port 108. The harness 106 may be packaged with a single configuration device 110 and the two may together be associated with a single part number. In some embodiments, different part numbers may be associated with the harness 106 and the configuration device(s) 110 for connecting to port 108 even if they form part of a kit and are packaged together. In some embodiments, the kit comprises all of the configuration devices 110 for connecting to port 108 that may be used with the given harness 106. In some embodiments, the harness 106 is associated with one part number and the set of configuration devices 110 for connecting to port 108 are associated with another part number, whether or not they form part of a kit. In some embodiments, the kit comprises a harness 106 and a corresponding configuration device 110 for connecting to port 108 for each possible configuration setting. For example, a harness 106 having two configuration settings may be provided in a kit comprising two harnesses 106, a first configuration device 110a for the first configuration setting and a second configuration device 110b for the second configuration setting, that both connect to port 108. Similarly, a harness 106 having three configuration settings may be provided in a kit comprising three harnesses 106 and three configuration devices 110a, 110b, 110c that connect to port 108. Other packaging embodiments may also be used.

Figure 6:
FIG. 6 is a flowchart of an exemplary method for configuring an aircraft system.

In accordance with the above, there is provided a method for configuring an aircraft system to one of at least two configuration settings, as illustrated in the exemplary flowchart of FIG. 6. As per 602, an aircraft assembly is received comprising the structural part 100 and the harness 106 in its neutral state. As per 604, the aircraft assembly is assembled with the system 102 through the harness 106 at the Final Assembly Line (FAL). The aircraft assembly may also be assembled with other aircraft structural parts, and/or systems and/or components at the FAL. The FAL is the stage of the manufacturing process at which a finished product is assembled. In accordance with the present method, the aircraft assembly may remain neutral until the FAL. As per 606, the harness 106 may be configured at the FAL by inserting the configuration device 110 in the configuration port 108.

The method is applicable to various systems 102, as listed above. The systems 102 may be LRUs, or any other system having multiple configuration settings. Configuring of the harness 106 may be performed by a low-level line operator. It does not require any skill, such as that of a technician, or knowledge of the functioning of the assembly or the system. In addition, it does not require any dismantling of previously assembled components, and does not require any on-the-spot programming of pins via switches or other devices. The present method allows for commonality between aircraft structural parts while simplifying configuration between aircraft types and between other aircraft options.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure, For instance, the blocks may be performed in a differing order, or blocks may be added, deleted, or modified, The structure illustrated is thus provided for efficiency of teaching the present embodiment. The present disclosure may be embodied in other specific forms without departing from the subject matter of the claims. Also, one skilled in the relevant arts will appreciate that while the embodiments disclosed and shown herein may comprise a specific number of elements/components, they may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A cable harness configurable from a neutral state to one of at least two configuration settings, the cable harness comprising:
    a set of conducting wires bound together and having at least a first end and a second end;
    a connector disposed at the first end of the set of conducting wires for connecting to a system and adapted to provide one or more of signals and electrical power from the set of conducting wires to the system; and
    a configuration device adapted to configure the cable harness from the neutral state to the one of the at least two configuration settings,
    wherein the set of conducting wires comprises a configuration port disposed intermediate the first end and the second end of the set of conducting wires and adapted to mate with the configuration device adapted to configure the cable harness.

2. The cable harness of claim 1, wherein the configuration port is one of a male and a female connector, and the configuration device is the other of the male and female connector.

3. The cable harness of claim 2, wherein the conducting wires are bound together by a sleeve and at least part of the sleeve is disposed between the connector and the configuration port.

4. The cable harness of claim 2, wherein the configuration port is disposed exterior of the sleeve.

5. The cable harness of claim 4, wherein the second end of the set of conducting wires has a terminal for connecting to another harness or system.

6. The cable harness of claim 1, wherein the second end of the set of conducting wires has a terminal for connecting to another harness or system and the configuration port is disposed between the connector and the terminal.

7. The cable harness of claim 1, wherein:
    the configuration port comprises three output pins via which two of the at least two configuration settings can be enabled; and
    the configuration device shorts two of the three output pins together to configure the cable harness when the configuration device is mated with the configuration port.

8. The cable harness of claim 7, wherein the conducting wires are bound together by a sleeve and at least part of the sleeve is disposed between the connector and the configuration port.

9. The cable harness of claim 7, wherein the second end of the set of conducting wires has a terminal for connecting to another harness or system.

10. The cable harness of claim 1, wherein:
    the configuration port comprise a first, a second and a third output pin via which two of the at least two configuration settings can be enabled; and
    the configuration port is configured so that shorting the first and second output pins together enables a first of the at least two configuration settings, and shorting the first and third output pins together enables a second of the at least two configurations.

11. The cable harness of claim 10, wherein the second end of the set of conducting wires has a terminal for connecting to another harness or system.

12. The cable harness of claim 1, wherein:
    the configuration port comprises four output pins via which four of the at least two configuration settings can be enabled; and
    the configuration device shorts three of the four output pins together to configure the cable harness when the configuration device is mated with the configuration port.

13. The cable harness of claim 12, wherein the conducting wires are bound together by a sleeve and at least part of the sleeve is disposed between the connector and the configuration port.

14. The cable harness of claim 12, wherein the second end of the set of conducting wires has a terminal for connecting to another harness or system.

15. The cable harness of claim 1, wherein:
    the configuration port comprise a first, a second, a third and a fourth output pin via which four of the at least two configuration settings can be enabled; and
    the configuration port is configured so that:
        shorting the second, third and fourth output pins together enables a first of the at least two configuration settings;
        shorting the first, second and fourth output pins together enables a second of the at least two configuration settings;
        shorting the first, third and fourth output pins together enables a third of the at least two configuration settings; and
        shorting the first, second and third output pins together enables a fourth of the at least two configuration settings.

16. The cable harness of claim 15, wherein the second end of the set of conducting wires has a terminal for connecting to another harness or system.

* * * * *